United States Patent
Bakhmutsky

(10) Patent No.: US 6,826,294 B1
(45) Date of Patent: Nov. 30, 2004

(54) BLOCK MATCHING MOTION ESTIMATION USING REDUCED PRECISION CLUSTERED PREDICTIONS

(75) Inventor: Michael Bakhmutsky, Spring Valley, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 715 days.

(21) Appl. No.: 09/263,921

(22) Filed: Mar. 5, 1999

(51) Int. Cl.[7] .................................................. G06K 9/00
(52) U.S. Cl. .................... 382/107; 382/236; 375/240.16
(58) Field of Search .......................... 348/402.1, 407.1, 348/413.1, 416.1, 431.1, 699, 700; 375/240.16, 240.17; 382/107, 236, 124

(56) References Cited

U.S. PATENT DOCUMENTS

RE35,093 E * 11/1995 Wang et al. ............. 348/413.1
6,020,934 A * 2/2000 Greenfield et al. ......... 348/699
6,134,340 A * 10/2000 Hsu et al. ................... 382/124

FOREIGN PATENT DOCUMENTS

EP      0865199 A1   9/1998   ............ H04N/5/14

* cited by examiner

*Primary Examiner*—Timothy M. Johnson

(57) ABSTRACT

A block matching motion estimation algorithm uses reduced precision data when comparing pictures in the block to be compressed with pictures in a reference block. This yields a plurality of best match candidates. The average of the best match candidates, excluding those candidates which fall outside a predetermined cluster boundary, is determined and then a second search is performed focused on this average. In this way, the amount of hardware for the block matching algorithm is decreased and the speed of its operation is enhanced.

12 Claims, 4 Drawing Sheets

BLOCK MATCHING MOTION ESTIMATION USING REDUCED PRECISION CLUSTERED PREDICTIONS

BACKGROUND OF THE INVENTION

The invention relates to the field of digital video compression and specifically to a method for producing a motion vector while reducing the complexity and increasing the speed of the required computations.

Historically, in communication systems, a transmitter would send information to a receiver in an analog format. This means a continuous stream of data (generally voltage variations) is sent from the transmitter to the receiver. The problem with this type of transmission is that there will inevitably be some loss in information. To reduce this loss, many transmission systems have moved to a digital format where the data is converted into a binary digital stream (a sequence of zeros and ones). This type of transmission is useful in that it is robust—it can be stored, recovered, transmitted, processed, etc., all without virtually any error. Any system using the data merely has to distinguish between a zero and a one which is generally easy to do.

A problem arises, however, with a digital transmission that was generally not present in analog transmission. A video stream can be broken down into a series of juxtaposed frames. When a frame is digitized so that it can be transmitted digitally, the frame contains a large amount of data (the series of zeroes and ones), which is much greater than the data required to represent an analog picture. This data is sent to the receiver through a transmission medium which can handle only a finite amount of data per time interval. This becomes problematic when a user requires continuously updated data. For example, in television, film, or other types of video communications, the illusion of motion would be frustrated if there was too large a time interval between consecutive frames. A typical transmission medium may not be able to handle the large amount of data present in a digital transmission in the time interval necessary for many applications. This problem led to the introduction of compression technology which is focused on representing and transmitting a frame of data using fewer bits than without compression.

Briefly, compression algorithms recognize that not every bit of every frame of data need be encoded and transmitted. Samples of data are generally similar enough to each other so that one sample could be used as an estimate of the next sample. These similarities can be further broken down into spatial and temporal relations. Spatial similarities assume that for a given frame of data, information in one portion of the frame will be similar to other information in the same frame. Temporal similarities assume that consecutive frames will generally be similar. This means a frame can basically be represented by a frame which came immediately before it. The temporal similarities are determined using motion estimation algorithms.

There are many types of motion estimation algorithms. These include: the block-based method, pixel-based recursion, and feature based. The block based method, generally referred to as a block matching algorithm, has been adopted by several video compression standards including H.261 and MPEG (Moving Picture Experts Group), and is the focus of the invention.

In the block matching algorithm, a field or frame (collectively referred to hereinafter as a "picture") which is to be motion compressed is compared to a previously encoded picture which is not motion compressed. The comparison is a correlation of the luminance values between the pictures. The non-motion compressed pictures are called I-pictures (or intra-pictures). They are compressed using only spatial techniques such as a discrete cosine transform. During compression, the first picture to be encoded, which is compared to the I-picture, is called a P-picture (predictive). The P-picture or I-picture could also be used as a reference for encoding a B-picture (bi-directional, prediction can come from prior or subsequent I- or P-pictures). Therefore the terms "reference picture" and "coded picture" will be used throughout the specification to avoid limitation in scope. All of the pictures (both coded and reference) are divided into a plurality of picture elements ("pixels" or "pels"). A macroblock is defined as a rectangular block having 16 by 16 pixels and is the foundation of block matching compression techniques.

For each macroblock of coded picture, a search is performed in a corresponding search area of a reference picture for the macroblock yielding the best match. A best match motion vector is ascertained which starts at the origin of the coded macroblock and points to the macroblock in the reference picture within the search area. The search area is basically a window of the reference picture which generally corresponds spatially to the macroblock of the coded picture. The best match is usually determined by subtracting the corresponding pixels in each macroblock from one another, squaring the result, and then adding up all the squared subtracted values. This is known as the Mean Square Error and is mathematically expressed as $$MSE(i, j) = \frac{1}{N^2} \sum_{m=1}^{N} \sum_{n=1}^{N} (S_t(m, n) - S_{t-1}(m - i, n - j))^2, -w \leq (i, j) \leq w$$

where N×N is a rectangular block size, w is the search range, $S_t$ is the block to be motion compressed in the coded picture, $S_{t-1}$ is the reference picture, and i and j represent the horizontal and vertical shift, respectively, of the reference macroblock in the reference picture. This produces the most accurate comparison because any differences between the compared blocks are squared thereby emphasizing larger differences.

As can easily be discerned, this comparison is an expensive process because it requires a multiplier which is not cheaply realized in silicon technologies. Moreover, this comparison is performed for each possible macroblock location in the search range. Considering the large amount of computations required, and the need for a multiplier, this comparison is generally not used in real world applications, but is useful in computer simulations.

One example of a more practical comparison is the Mean Absolute Error (MAE). This computation is similar to the MSE but takes the absolute value of the results instead of squaring them. The Mean Absolute Error is thus defined as:

$$MAE(i, j) = \frac{1}{N^2} \sum_{m=1}^{N} \sum_{n=1}^{N} |S_t(m, n) - S_{t-1}(m - i, n - j)|, -w \leq (i, j) \leq w$$

However, even this comparison causes problems because the search area chosen could be quite large and each computation requires many circuits. To illustrate, the following 10 stages of circuitry would be necessary:

Stage 1: 256 subtraction circuits (comparing the coded picture to the reference picture).

Stage 2: 256 square compute circuits (if using the MSE) or absolute value circuits (if using MAE).

Stage 3: 128 summation circuits to add 256 numbers.
Stage 4: 64 summation circuits to add 128 numbers.
Stage 5: 32 summation circuits to add 64 numbers.
Stage 6: 16 summation circuits to add 32 numbers.
Stage 7: 8 summation circuits to add 16 numbers.
Stage 8: 4 summation circuits to add 8 numbers.
Stage 9: 2 summation circuits to add 4 numbers.
Stage 10: 1 summation circuit to add 2 numbers.

Ten stages are required for every macroblock being compared. Each adder can generally perform only one addition per clock cycle. So, even when the Mean Absolute Error is used, there is still a 10 stage delay.

One prior art solution utilizing a hierarchical approach, decimates the reference picture thereby reducing the number of pixels which need to be analyzed. The decimation process generally includes taking a specified number of pixels, usually 4, in the horizontal and vertical direction, and replacing them with their average value. This yields a picture with 16 times less information which can be more easily processed but with decreased precision. The decimated image is searched and a relatively imprecise motion vector is determined. Then, based on the imprecise motion vector, a second detailed search is performed on the full image centered around the imprecise motion vector but with a smaller search range. However, even during the decimated search portion, this technique still requires an enormous amount of computations to be performed for each iteration of computing the MSE or MAE. This hierarchical technique is thus costly because a large amount of hardware is still necessary due to pixels with full precision accuracy being analyzed even within the decimated image.

Therefore, there exists a need for a motion estimation technique which is less expensive to implement and which requires less processing time than the techniques of the prior art.

OBJECTS AND SUMMARY OF THE INVENTION

One aspect of the invention is a method for locating a first block in a first picture which corresponds to a second block in a second picture. The method includes dividing the first and second pictures into a plurality of pixels, each of the pixels having a value with a first precision, and defining a first search area within the first picture. The method further includes reducing the precision of the values of the pixels in the first and second pictures thereby producing pixels with a second precision. The method still further includes comparing the pixels with the second precision in the second block with pixels with the second precision in all blocks disposed within the first search area, thereby producing a plurality of best match candidates, and averaging the best match candidates to produce the first block.

This aspect, like the ones which follow, yields a method of finding a motion vector which is faster and less costly than prior art techniques. This is accomplished through the comparison of reduced precision pixels.

In another aspect of the invention a computer readable storage medium contains data for locating a first block in a first picture which corresponds to a second block in a second picture. The data includes the steps of dividing the first and second pictures into a plurality of pixels, each of the pixels having a value with a first precision, and defining a first search area within the first picture. The data further includes steps for reducing the precision of the values of the pixels in the first and second pictures thereby producing pixels with a second precision. The data still further includes steps for comparing the pixels with the second precision in the second block with pixels with the second precision in all blocks disposed within the first search area, thereby producing a plurality of best match candidates; and averaging the best match candidates to produce the first block.

Yet another aspect of the invention is a transmitter for transmitting data from a transmitter to a receiver, the data including a plurality of pictures of at least a first and second type. The transmitter comprising transmitting means for transmitting the data; means for dividing the pictures of first and second type into a plurality of pixels, each of the pixels having a value with a first precision. The transmitter further includes means for dividing the pictures of first and second type into a plurality of blocks, the blocks each including a plurality of the pixels; means for defining a first search area within the pictures of the first type; and means for reducing the precision of the values of the pixels in the pictures of a first and second type thereby producing pixels with a second precision. The transmitter still further includes means for comparing the pixels with the second precision in a first block in a picture of the second type with pixels with the second precision in all blocks disposed within the first search area, thereby producing a plurality of best match candidates; and means for averaging the best match candidates to produce a computed best match.

It is an object of the invention to produce a method of determining a motion vector which faster and less expensive than prior art techniques.

These objects, as well as others, will become more apparent from the following description read in conjunction with the accompanying drawings where like reference numerals are intended to designate the same elements.

DETAILED DESCRIPTION OF THE PREFERRED EMBODIMENT(S)

Figure 1:
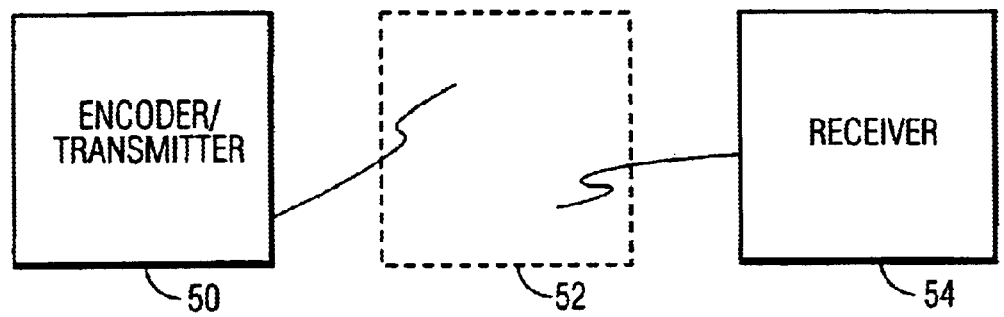
FIG. 1 is a diagram showing a transmission system for use with the invention.
Figure 2:
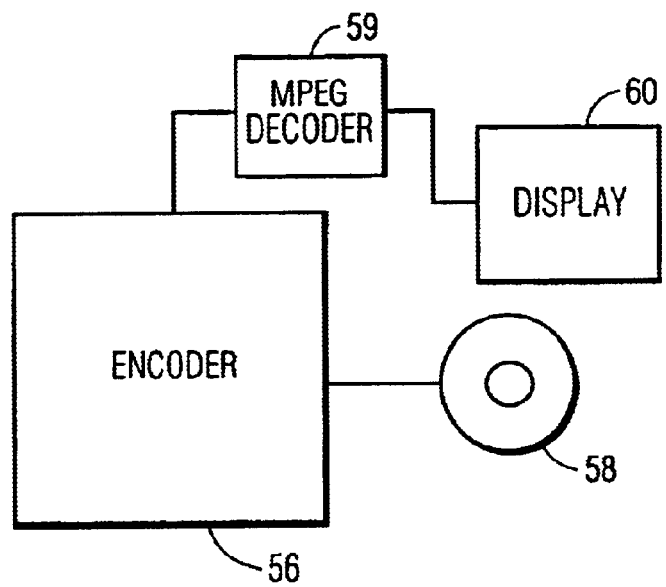
FIG. 2 is a diagram showing a storage medium which uses the invention to store data.

In FIG. 1 an encoder 50 encodes and compresses a stream of data which is sent via a transmission medium 52 to a receiver 54. Transmission medium 52 could be, for example, coaxial wire, air (in the case of a terrestrial transmission), or any other suitable transmission medium. Alternatively, as is shown in FIG. 2, the invention could be used to simply encode and compress data using an encoder 56, onto a recording medium 58 or directly to a display 60 through MPEG decoder 59. Any conventional MPEG decoder can be used.

Figure 3:
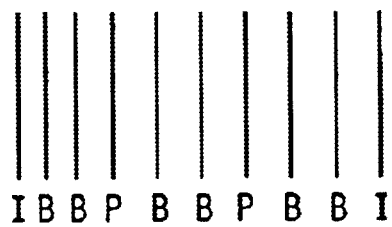
FIG. 3 is a diagram of an exemplary sequence of I- and P-, and B-pictures.
Figure 4:
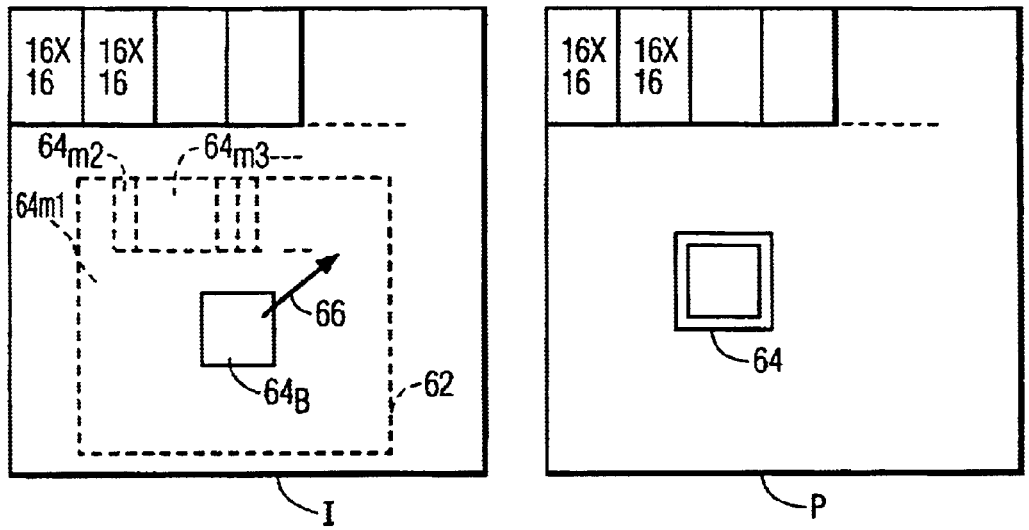
FIG. 4 is a diagram juxtaposing a reference picture and a coded picture thereby indicating how a search is performed for a block in the reference picture which corresponds to a block in the coded picture.

FIG. 3 shows a typical series of I- P-, and B-pictures which are to be encoded. Each I-picture is encoded independently of the other pictures; that is, only spatial ("intra-picture") compression is performed on these pictures. A P-picture is motion compressed based upon a comparison with an I-picture. A B-picture is motion compressed based on a comparison with either I- or P-pictures. As shown in FIG. 4, each of these coded pictures are divided into a plurality of macroblocks which are defined as a square of 16×16 pixels. Similarly, the reference picture used for comparison is also divided into a plurality of macroblocks.

For each macroblock to be encoded 64 in the coded picture, a search is performed in the reference picture for the block which most corresponds to macroblock to be encoded 64. This search is performed in a search area 62 for a best match macroblock $64_b$. Search area 62 is divided into a plurality of overlapping macroblocks. For example, a first macroblock is examined and then the system moves one row of pixels to create the origin of a new macroblock to be examined. These macroblocks are shown as $64_{mi}$ where m stands for match and i is the i-th number of the macroblock. The idea behind this search is that since the reference picture was already transmitted, we could use the data from the reference picture, pick the best match macroblock $64_b$ in the reference picture which most corresponds to the macroblock to be encoded 64, create a motion vector 66 which indicates any translational displacement between best match macroblock $64_b$ and macroblock to be encoded 64, and then transmit any luminance value differences between macroblock to be encoded 64 and best match macroblock $64_b$.

The invention is based on the fact that the increased hardware and decreased speed existing in the prior art techniques are based upon the fact that the entire luminance value, usually represented by 8 bits, is used in the comparison between the coded and reference pictures. The invention thus rounds all of the luminance values to a smaller number of bits—for example 4—and then the search is performed as is known in the art except that a plurality of best match candidates is ascertained. In MAE and MSE calculations, many adders are required. Reducing the number of bits involved in the comparisons, increases the speed in which the adders could operate. This clearly results in a less precise search but that may be sufficient for applications where a smaller ratio of data compression is acceptable (i.e. a camcorder display).

For applications which do require a more precise estimation, the invention further finds a group of best matches. This is distinguished from prior art techniques which only find one best matching block and store it. There is a decrease in precision by rounding the luminance values as explained above and so a group of best matching blocks is stored in a first step of the block matching process. Statistically, this group, or cluster, will be centered around the macroblock with the best match.

The rounding of the luminance values can be performed in many known ways. For example, if one were to round to 4 bits from 8, the least significant nibble would be rounded off. If a luminance value is represented by the 8 bit value $5X_{hex}$, if X was equal to 0 to 7, the number would be rounded to $50_{hex}$ which would be quantized to a level 5. Similarly, if X was between 8 and 15, then the number would be rounded to $60_{hex}$ or quantized to a level 6.

Figure 5:
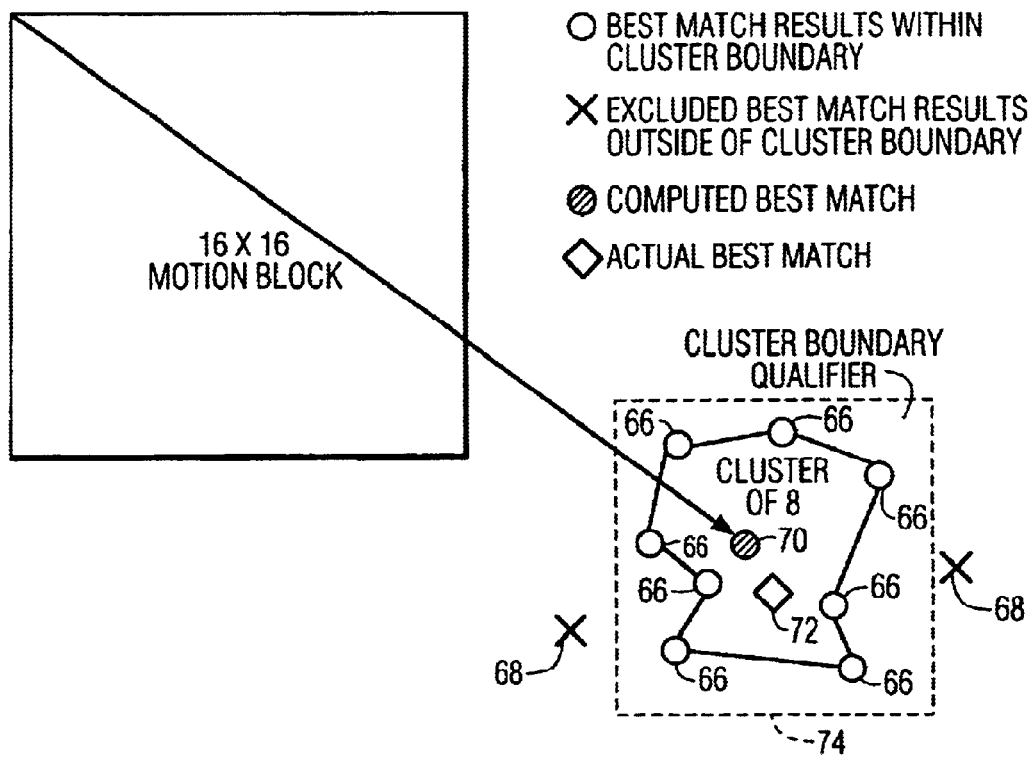
FIG. 5 is a diagram showing how a plurality of best match results are used to produce a computed best match.

Referring to FIG. 5, ten best match candidates are ascertained. (Clearly, 10 is an arbitrary number and more or less candidates could be used.) A cluster boundary qualifier box 74 is formed around a plurality of the best match candidates which are within a predefined proximity of each other thereby-producing excluded match results 68 which fall outside the boundary and including a number of included match results 66 falling inside the boundary. The cluster boundary qualifier box 74 can be formed using many techniques. For example, the center formed by a majority of the best match candidates can be ascertained and then a distance from that center chosen dictating a side of the box. An average of all the included match results 66 is taken to produce a computed best match 70. As can be discerned, this computed best match 70, even though produced from less precise data, is close to the actual best match 72.

Figure 6:
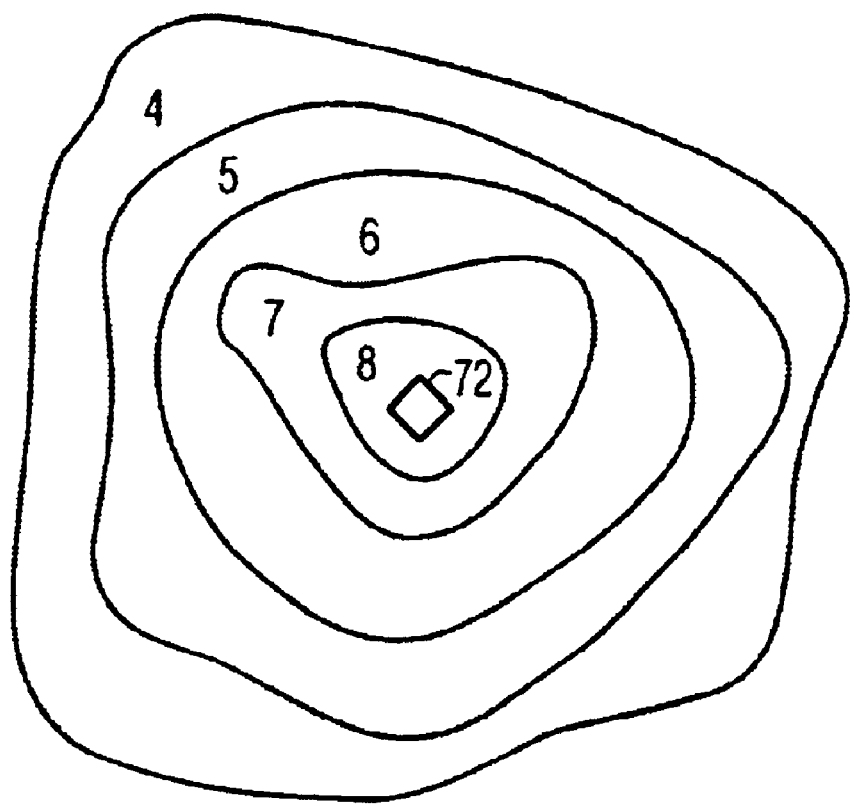
FIG. 6 is a diagram showing how differing precision levels of data produce extrapolated contours which center around an actual best match macroblock.

This phenomena of producing a computed best match 70 near an actual best match 72 even though less precise data is used, can be explained with reference to FIG. 6. In FIG. 6, contours are shown representing the connected extrapolation of included best match results for five distinct luminance value representations. As is shown, if an 8 bit representation is used for the luminance value, the best match results will statistically be closer to actual best match 72 and will be located within a contour which has a smaller area than a representation of 7 or fewer bits. This is because all of these included best match results fall close to actual best match 72. However, regardless of how many bits are used, if one takes an average of the results, one would still come up with a value which is close to the actual best match 72. The phenomena could be analogized to a game of darts. Those with the greatest skill in the game are like the 8-bit version and will produce results all near the actual best match 72. Similarly, those who are not as skilled, like the 4 bit version, will produce results which are generally further away from the actual best match 72. However, it is clear, regardless of the choice of skill (or data representation), what was the actual target (or actual best match).

Referring back to FIG. 5, once the computed best match 70 is determined, a second search can be performed on full 8-bit luminance data but for a much smaller search area centered around computed best match 70. For example, a square with a side of 2–4 pixels surrounding computed best match 70 could be defined, and then the search area would include the macroblocks with origins corresponding to each of the pixels in the square. As stated above, this second search does not have to be performed for applications which do not require as much quality.

Figure 7:
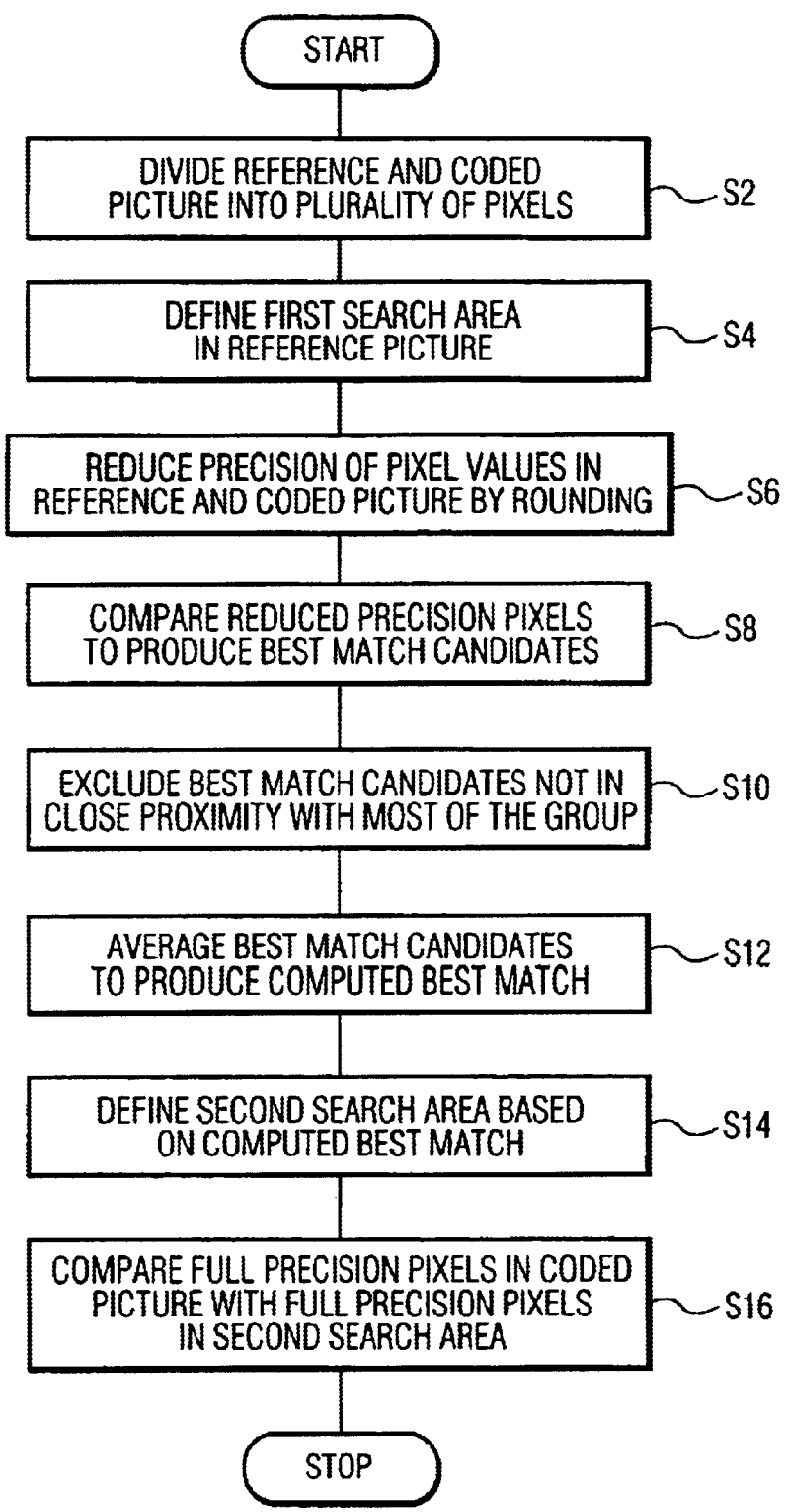
FIG. 7 is a flow chart summarizing the invention.

The invention can be summarized with reference to FIG. 7. In step S2, the picture to be encoded and the reference picture are divided into a plurality of pixels. In step S4, a first search area is defined in the reference picture. The precision of all of the pixels is reduced by rounding in step S6. In step S8, the reduced precision pixels are compared to produce best match candidates. To improve precision, the best match candidates which do not fall within close proximity with the rest of the group of best match candidates can be optionally removed from consideration in step S10. In step S12, the average of the remaining best match candidates is taken to produce a computed best match. A second search can be performed around the computed best match in step S14 and a second comparison is performed on full precision pixels in step S16.

Therefore, by performing a first search on less precise data, the hardware necessary to perform the motion vector computation is reduced and the time required to find the motion vector is decreased. The smaller bit arithmetic operation leads to faster hardware implementation. This technique alone is sufficient for situations where smaller compression ratios are acceptable. However, by storing a plurality of included best match results and then performing a second search based upon the average of the first best match results, the precision lost by analyzing reduced precision data is returned.

Having described the preferred embodiments it should be made apparent that various changes could be made without departing from the scope and spirit of the invention which is defined more clearly in the appended claims.

What is claimed is:

1. A method for locating a first block in a first picture which corresponds to a second block in a second picture, said method comprising:

defining a first search area within said first picture;

reducing the precision of the values of pixels in said first and second pictures thereby producing pixels with a second precision;

comparing the pixels with said second precision in said second block with pixels with said second precision in all blocks disposed within said first search area, thereby producing a plurality of best match candidates; and averaging said best match candidates to produce said first block.

2. The method as claimed in claim 1 further comprising the steps of:

defining, after said step of averaging, a second search area based upon said first block; and comparing the pixels with said first precision in said second block with pixels with said first precision in all blocks disposed within said second search area, thereby producing a more accurate first block.

3. The method as claimed in claim 1 further comprising:

creating a cluster boundary qualifier enclosing a plurality of said best match candidates which are located within a predetermined proximity of each other; and excluding from consideration any best match candidates which are not included in said cluster boundary qualifier.

4. The method as claimed in claim 1 wherein said step of reducing the precision comprises rounding said value of all of said pixels.

5. A computer readable storage medium containing data for locating a first block in a first picture which corresponds to a second block in a second picture, said data including the following steps:

defining a first search area within said first picture;

reducing the precision of the values of pixels in said first and second pictures thereby producing pixels with a second precision;

comparing the pixels with said second precision in said second block with pixels with said second precision in all blocks disposed within said first search area, thereby producing a plurality of best match candidates; and averaging said best match candidates to produce said first block.

6. The computer readable storage medium as claimed in claim 5 further comprising data for performing the steps of:

defining, after said step of averaging, a second search area based upon said first block; and comparing the pixels with said first precision in said second block with pixels with said first precision in all blocks disposed within said second search area, thereby producing a more accurate first block.

7. The computer readable storage medium as claimed in claim 5 further comprising data for performing the steps of:

creating a cluster boundary qualifier enclosing a plurality of said best match candidates which are located within a predetermined proximity of each other; and excluding from consideration any best match candidates which are not included in said cluster boundary qualifier.

8. The computer readable storage medium as claimed in claim 5 wherein said step of reducing the precision comprises rounding said value of all of said pixels.

9. A transmitter for transmitting data from a transmitter to a receiver, said data including a plurality of pictures of at least a first and second type, said transmitter comprising;

transmitting means for transmitting said data;

means for dividing said pictures of first and second type into a plurality of blocks, said blocks each including a plurality of pixels;

means for defining a first search area within said pictures of said first type;

means for reducing the precision of the values of said pixels in said pictures of a first and second type thereby producing pixels with a second precision;

means for comparing the pixels with said second precision in a first block in a picture of said second type with pixels with said second precision in all blocks located within said first search area, thereby producing a plurality of best match candidates; and means for averaging said best match candidates to produce a computed best match.

10. The transmitter as claimed in claim 9 further comprising:

means for defining a second search area based upon computed best match; and means for comparing the pixels with said first precision in said first block with pixels with said first precision in all blocks disposed within said second search area, thereby producing a more accurate computed best match result.

11. The transmitter as claimed in claim 9 further comprising:

means for creating a cluster boundary qualifier enclosing a plurality of said best match candidates which are disposed within a predetermined proximity of each other; and means for excluding from consideration any best match candidates which are not included in said cluster boundary qualifier.

12. The transmitter as claimed in claim 9 said means for reducing the precision comprises means for rounding said value of all of said pixels.

* * * * *